United States Patent
Watanabe

(10) Patent No.: US 6,396,556 B1
(45) Date of Patent: May 28, 2002

(54) LIQUID CRYSTAL DISPLAY

(75) Inventor: Takahiko Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/362,009

(22) Filed: Jul. 27, 1999

(30) Foreign Application Priority Data

Aug. 13, 1998 (JP) .......................................... 10-229142

(51) Int. Cl.[7] .......................................... G02F 1/1343
(52) U.S. Cl. ..................................................... 349/141
(58) Field of Search ........................................ 349/141

(56) References Cited

U.S. PATENT DOCUMENTS 6,052,168 A * 4/2000 Nishida et al. ............. 349/141

FOREIGN PATENT DOCUMENTS

| JP | 0 703 6058 A | 7/1995 |
| JP | 8-62578 | 3/1996 |
| JP | 9-5764 | 1/1997 |
| JP | 9-80473 | 3/1997 |
| JP | 0 917 9096 A | 11/1997 |
| JP | 0 931 8972 | 12/1997 |
| JP | 1 000 3092 A | 6/1998 |
| JP | 11-125836 | 5/1999 |
| JP | 11-153802 | 6/1999 |

* cited by examiner

Primary Examiner—Kenneth Parker
Assistant Examiner—David Chung
(74) Attorney, Agent, or Firm—Scully, Scott, Murphy & Presser

(57) ABSTRACT

Pairs of electrodes are disposed at a predetermined interval, each pair, which forms a unit, consisting of a lower comb-tooth-like electrode 103 and an upper comb-tooth-like electrode 107 which overlap each other by several micrometers. The electric field which is originated from the upper comb-tooth-like-electrode 107 is vertical on the surface of the electrode. In addition, with respect to the electric field which is originated from the lower comb-tooth-like-electrode 103, it is originated from the edge and the top flat portion thereof. In this condition, the electric field is vertical only in the vicinity of the upper comb-tooth-like-electrode 107 and the lower comb-tooth-like electrode 103. Moreover, the electric field which is originated from the edge of the lower comb-tooth-like electrode 103 extends within the insulation film layer 104 and the transistor protection film 108, and thus it is not applied to the liquid crystal. Therefore, since no vertical electric field exists in the space between the electrode pairs when the display is viewed from the front, through the space the light being transmitted, the transmitted light is uniform.

2 Claims, 4 Drawing Sheets

LIQUID CRYSTAL DISPLAY

BACKGROUND OF THE INVENTION

1. Field of the Invention

The present invention relates to a liquid crystal display of a transverse electric field driving type, having an electrode structure for driving an in-plane switching mode cell (hereinafter referred to as "IPS cell").

This application is based on Japanese Patent Application No. Hei 10-229142, the content of which is incorporated herein by reference.

2. Description of Related Art Including Information Disclosed Under 37 CFR 1.97 and 37 CFR 1.98

FIG. 4. FIG. 6 is a cross-sectional view of the electrode structure at section 6—6 of FIG. 4. The term "IPS" or "in-plane switching mode" indicates a mode of driving an active FIG. 4 is a plan view showing an electrode structure for driving a conventional IPS cell. FIG. 5 is a cross-sectional view of the electrode structure at section 5—5 of matrix display, in which a parallel electrode structure controls an electric field which is parallel to the substrate so as to drive the display. The electrodes which drive the IPS cell are gate electrodes 101, common electrodes 102, and comb-tooth-like electrodes 103, which are formed on a thin film transistor (TFT) glass substrate 100 by the same process. Then, an interlayer isolation film 104 and a semiconductor layer are sequentially formed, and island patterns 105 are formed by a photoresist process. Subsequently, drain lines 106 and upper comb-tooth-like electrodes 107 (which also serve as source electrodes) are formed. Then, a channel etching process and formation of a transistor protection film 108 are performed to complete an electrode substrate for driving an IPS cell.

The background art had the disadvantage in that transmitted light is uneven, since in the space between a lower comb-tooth-like electrode 103 and an upper comb-tooth-like electrode 107 when the display is viewed from the front, through the space light being transmitted, the molecules of the liquid crystal stand up in the vicinity of each comb-tooth-like electrode. That is, if the comb-tooth-like electrodes are disposed as shown in the cross-sectional view in FIG. 6, the electric field concentrates at the edges of the electrodes . The electric field is generated such that it is vertical to the substrate at the edges of the electrodes. If the liquid crystal used is of positive permittivity type, the molecules of the liquid crystal stand up at the edges of the electrodes. In this case, since the action of the molecules of the liquid crystal is similar to that in a TN (twisted nematic) mode, a dark image is formed in the vicinity of the edges of the electrodes. Thus, unevenness of transmitted light is caused in which portions in the vicinity of the edges of the electrodes are dark while the middle portions are bright.

Related art is also disclosed in Japanese Unexamined Patent Application, First Publication (Kokai) No. Hei 9-318972, published on Dec. 12, 1997; Japanese Unexamined Patent Application, First Publication (Kokai) No. Hei 9-179096, published on Jul. 11, 1997; Japanese Unexamined Patent Application, First Publication (Kokai) No. Hei 10-3092, published on Jan. 6, 1998; and Japanese Patent (Granted) No. 2701698, published on Oct. 3, 1997.

BRIEF SUMMARY OF THE INVENTION

The present invention was achieved in view of the above circumstances, and thus the object of the present invention is to provide a liquid crystal display with which unevenness of transmitted light can be diminished.

In order to achieve the above object, the present invention provides a liquid crystal display having a parallel electrode structure for driving the display by controlling an electric field which is parallel to a substrate, the liquid crystal display comprising pairs of electrodes, each pair consisting of a common electrode and a pixel electrode which at least partially overlap each other, wherein the pairs of electrodes are disposed at a predetermined interval.

In addition, in the above liquid crystal display, the common electrodes may include lower comb-tooth-ike electrodes, and the pixel electrodes may be upper comb-tooth-like electrodes provided on an interlayer insulation film formed over the lower comb-tooth-like electrodes.

According to this invention, since pairs of electrodes, each pair consists of a common electrode and a pixel electrode overlapping each other by several micrometers, are disposed at a certain interval, the electric fields in the spaces between the electrode pairs when the display is viewed from the front extends in a single direction within a liquid crystal cell, and thereby unevenness of the transmitted light is diminished.

That is, the above constitution provides advantages in that the transmitted light is uniform since no vertical electric field exists in the space between the electrode pairs when the display is viewed from the front, through the space the light being transmitted, and thus unevenness of the transmitted light is diminished.

DETAILED DESCRIPTION OF THE INVENTION

Figure 1:
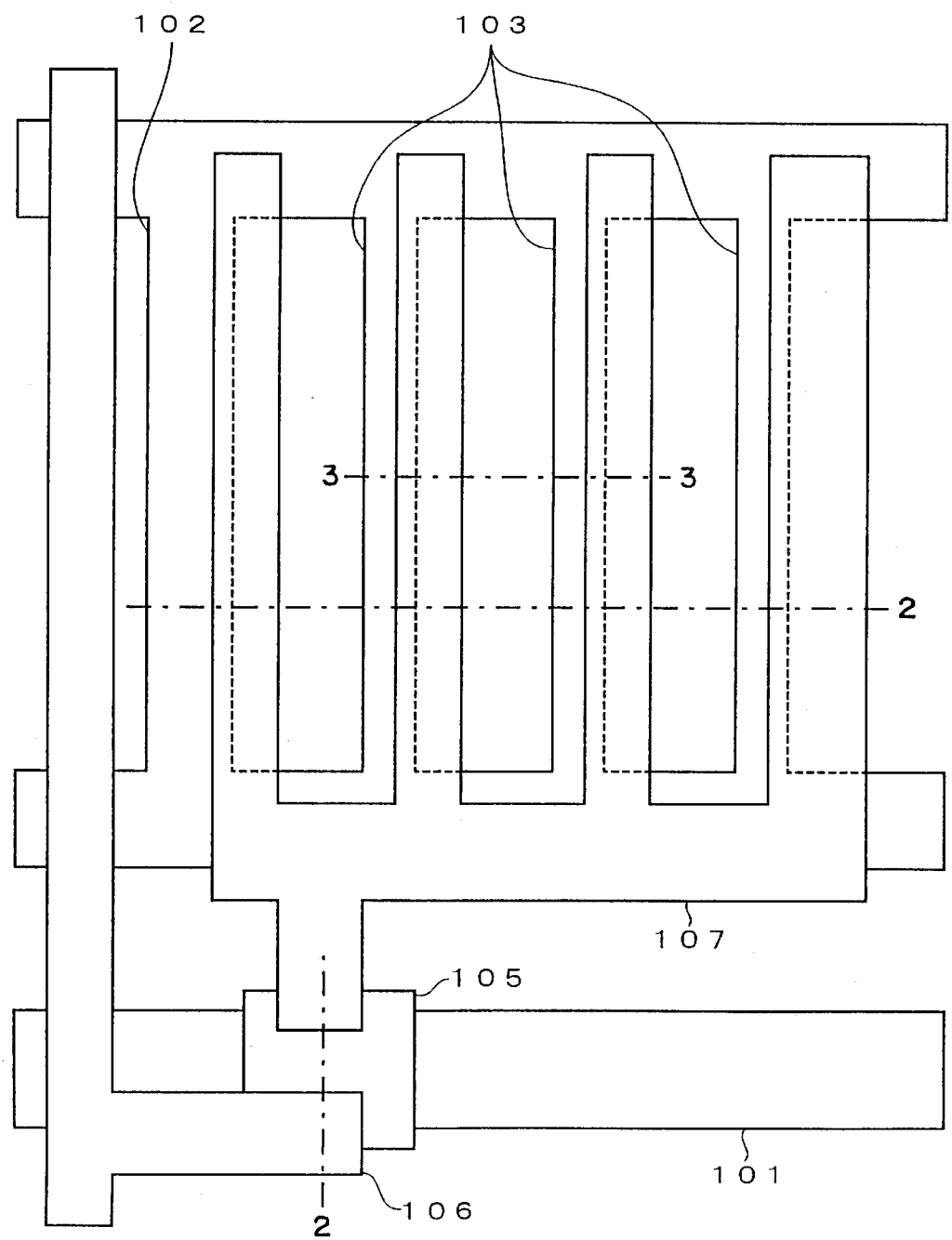
FIG. 1 is a plan view showing a unit pixel in a transmissive-type liquid crystal display according to the present invention.

An embodiment of the present invention will be described below, making reference to the drawings. In the drawings, reference numeral 100 indicates a TFT glass substrate, 101 indicates a gate electrode, 102 indicates a common electrode, 103 indicates lower comb-tooth-like electrode, 104 indicates an interlayer insulation film, 105 indicates an island pattern, 106 indicates a drain line, 107 indicates an upper comb-tooth-like electrode, and 108 indicates a transistor protection film.

Figure 2:
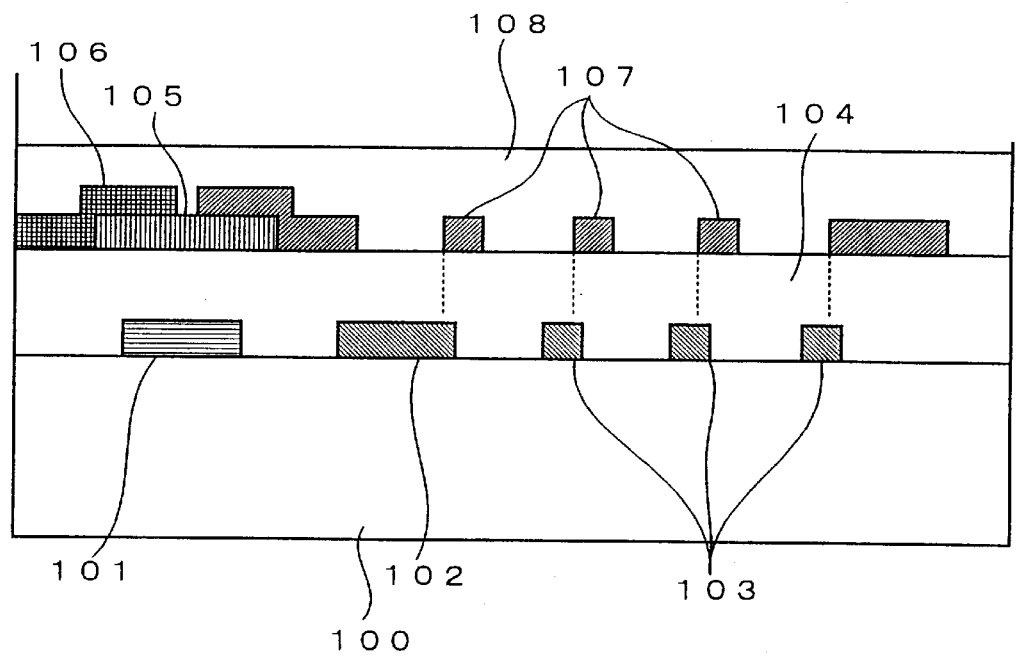
FIG. 2 is a cross-sectional view of the unit pixel at section 2—2 of FIG. 1 in the transmissive-type liquid crystal display according to the present invention.
Figure 3:
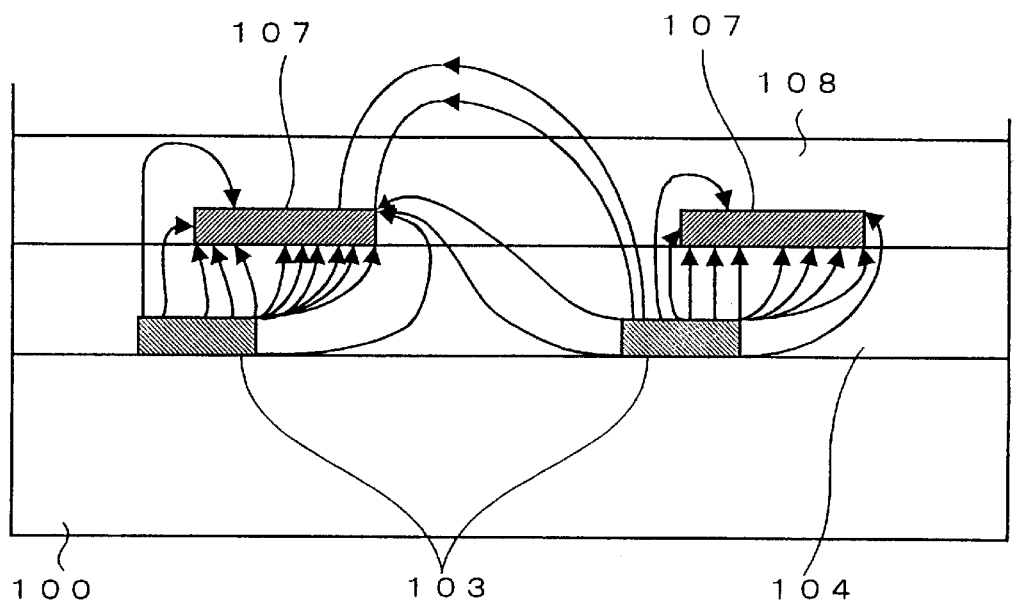
FIG. 3 is a cross-sectional view of the unit pixel at section 3—3 of FIG. 1 in the transmissive-type liquid crystal display according to the present invention.
Figure 4:
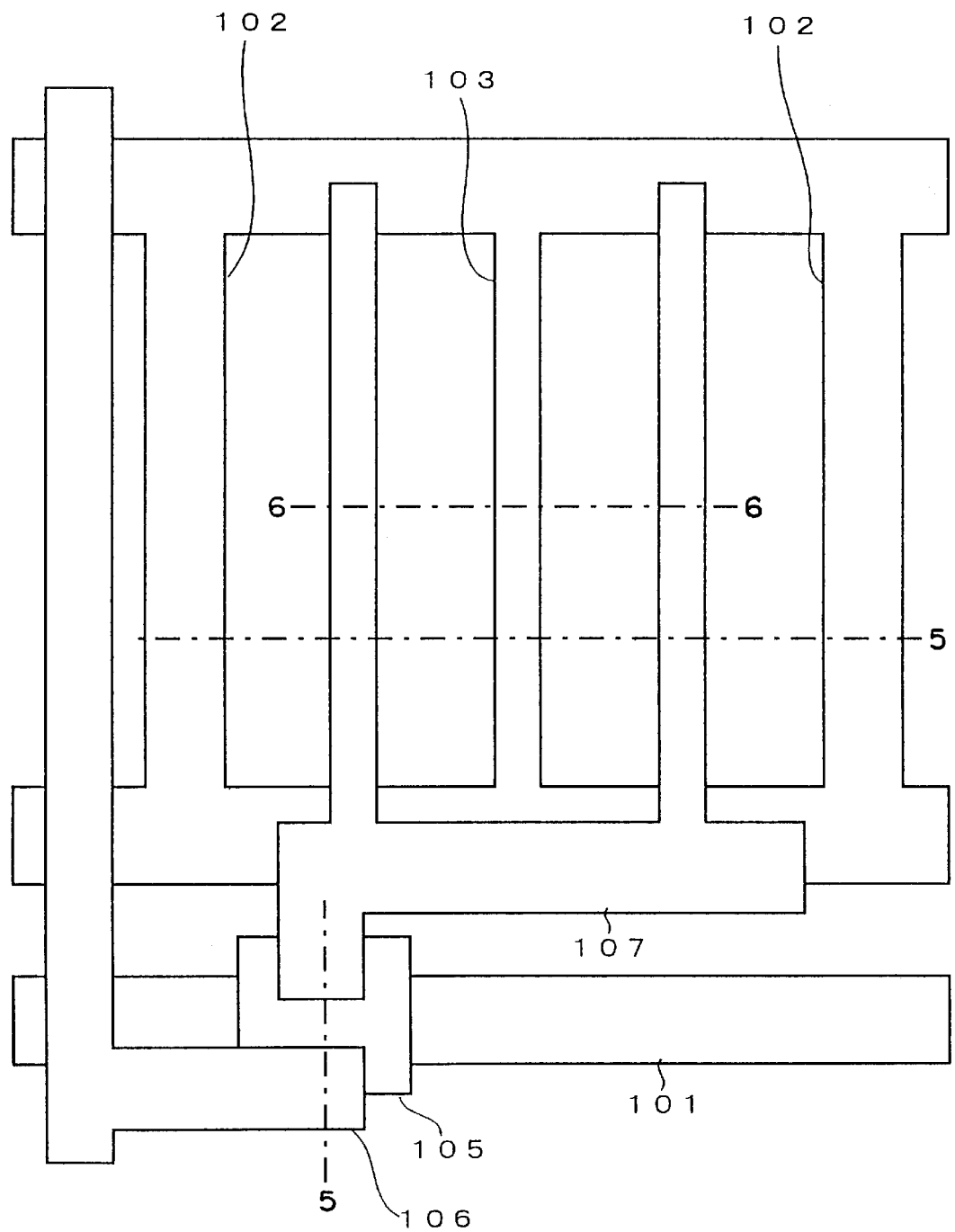
FIG. 4 is a plan view showing a unit pixel in a conventional transmissive-type liquid crystal display.
Figure 5:
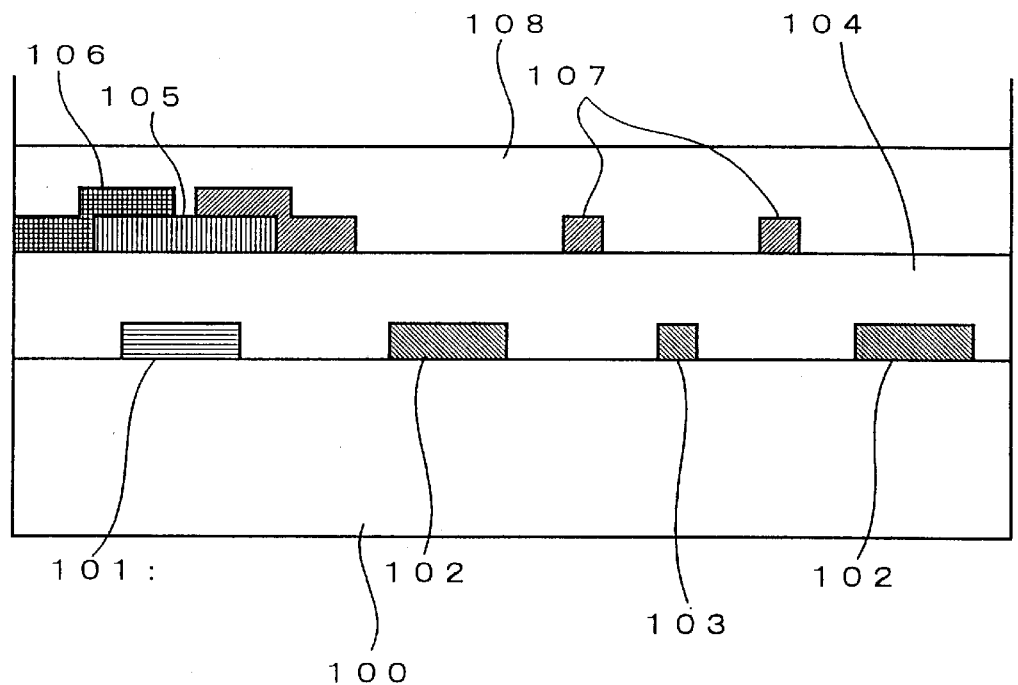
FIG. 5 is a cross-sectional view of the unit pixel at section 5—5 of FIG. 4 in the conventional transmissive-type liquid crystal display.
Figure 6:
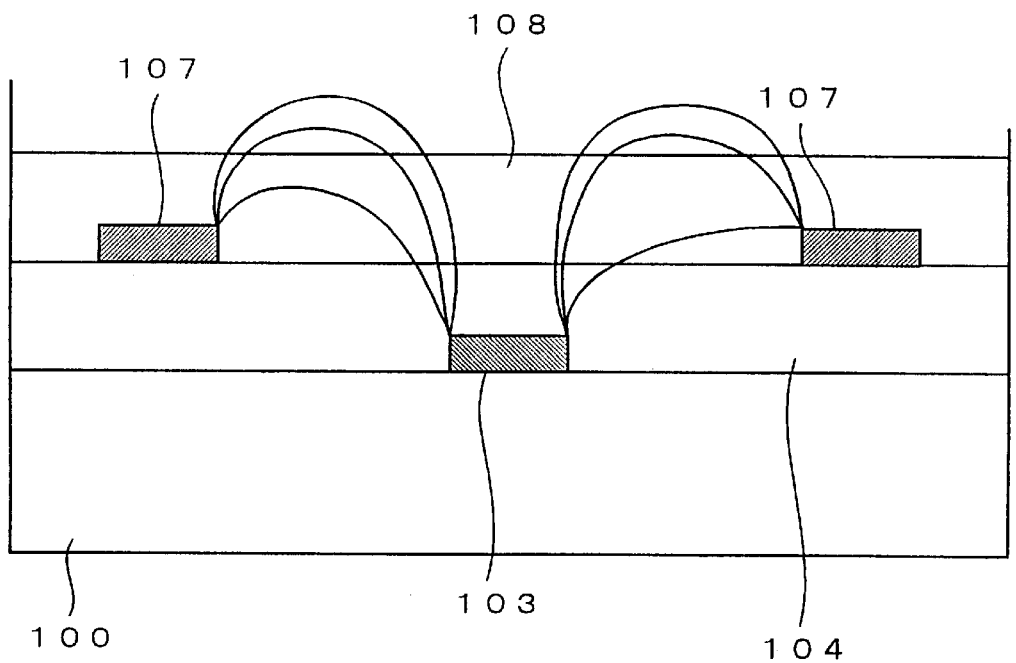
FIG. 6 is a cross-sectional view of the unit pixel at section 6—6 of FIG. 6 in the conventional transmissive-type liquid crystal display.

FIG. 1 is a plan view showing an electrode structure for driving an IPS cell according to the embodiment of the present invention. FIG. 2 is a cross-sectional view of the electrode structure at section 2—2 of FIG. 1. FIG. 3 is a cross-sectional view of the electrode structure at section 3—3 of FIG. 1. In FIGS. 1 to 3, the same reference numerals as those in FIGS. 4 and 5 are assigned to the components corresponding to those in FIGS. 4 and 5, and explanations of such components in FIGS. 1 to 3 are omitted. In FIGS. 1 to 3, pairs of electrodes are disposed at a predetermined interval, each pair, which forms a unit, consisting of a lower comb-tooth-like electrode 103 and an upper comb-tooth-like electrode 107 which overlap each other by several micrometers. In the pair of comb-tooth-like electrodes, whether the lower comb-tooth-like electrode 103 is positioned to the right or to the left of the upper comb-tooth-like electrode 107 may be arbitrarily decided depending on the layout.

In the above constitution, if a voltage is applied between the lower comb-tooth-like electrodes 103 and the upper comb-tooth-like electrodes 107 to generate an electric field, the electric field concentrates in the space between each pair of the lower comb-tooth-like electrode 103 and the upper comb-tooth-like electrode 107 as shown in FIG. 3. Accordingly, the electric field which is originated from the edge of the upper comb-tooth-like electrode 107 is curved toward the lower comb-tooth-like electrode 103. Therefore, only the electric field which is actually applied to the liquid crystal is originated from the top flat portion of the upper comb-tooth-like electrode 107. On the contrary, with regard to the lower comb-tooth-like electrode 103, the electric field at the top of the electrode is attracted by the closest upper comb-tooth-like electrode 107, and therefore only the electric field which is originated from the edge of the lower comb-tooth-like electrode 103 is applied to the liquid crystal.

Accordingly, the electric field which is originated from the upper comb-toothlike-electrode 107 is vertical on the surface of the electrode. In addition, with respect to the electric field which is originated from the lower comb-tooth-like-electrode 103, it is originated from the edge and the top flat portion thereof In this condition, the electric field is vertical only in the vicinity of the upper comb-tooth-like-electrode 107 and the lower comb-tooth-like-electrode 103. Moreover, the electric field which is originated from the edge of the lower comb-tooth-like electrode 103 extends within the insulation film layer 104 and the transistor protection film 108, and thus it is not applied to the liquid crystal. Therefore, in view of the electric field which is actually applied to the liquid crystal layer, since no vertical electric field exists in the space between the electrode pairs when the display is viewed from the front, through the space the light being transmitted, the transmitted light is uniform.

What is claimed is:

1. A liquid crystal display having a parallel electrode structure for driving the display by controlling an electric field which is parallel to a substrate, the parallel electrode structure having:

a common electrode which includes a plurality of lower comb-tooth-like electrodes which are parallel to each other and a portion which integrally connects the upper comb-tooth-like electrodes, and a pixel electrode which includes a plurality of upper comb-tooth-like electrodes which are parallel to each other and a portion which integrally connects the upper comb-tooth-like electrodes, and the liquid crystal display comprising:

pairs of electrodes, each pair consisting of one of the lower comb-tooth-like electrodes and one of the upper comb-tooth-like electrodes, which at least partially overlap each other, wherein the pairs of electrodes are disposed so that an interval from one pair to another pair is a predetermined interval.

2. A liquid crystal display according to claim 1, wherein the common electrode and the pixel electrode, between which an interlayer insulation film is interposed, are formed on the same substrate.

* * * * *